(12) United States Patent
Williams

(10) Patent No.: US 6,396,019 B1
(45) Date of Patent: May 28, 2002

(54) PIVOTABLE CABLE AND GUN HOLDER FOR MIG WELDER

(75) Inventor: Scott J. Williams, Green Bay, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/609,261

(22) Filed: Jun. 30, 2000

(51) Int. Cl.[7] ................................................. B23K 9/32
(52) U.S. Cl. ....................... 219/1.36; 219/133; 206/723
(58) Field of Search ............................. 219/130.1, 133, 219/136; 206/234, 722, 723; D15/144

(56) References Cited

U.S. PATENT DOCUMENTS

| | | | |
|---|---|---|---|
| 1,404,368 A | | 1/1922 | Hastey |
| 2,253,403 A | * | 8/1941 | Steinert ...................... 219/136 |
| D178,843 S | * | 9/1956 | McNutt ...................... D15/144 |
| 2,866,076 A | | 12/1958 | Aversten ...................... 219/98 |
| 3,247,807 A | | 4/1966 | Aversten ...................... 105/162 |
| 3,939,321 A | | 2/1976 | Bertrand et al. .............. 219/69 |
| 4,625,949 A | | 12/1986 | Walker ......................... 266/48 |
| 4,953,771 A | | 9/1990 | Fischer ........................ 224/273 |
| 5,266,772 A | | 11/1993 | Reed ............................ 219/137 |
| 5,330,146 A | | 7/1994 | Spykerman .............. 248/311.2 |
| 5,406,993 A | | 4/1995 | McGarvey .................. 141/198 |
| 5,489,054 A | | 2/1996 | Schiff .......................... 224/281 |
| 5,599,470 A | * | 2/1997 | Peotter et al. .............. 219/133 |
| 6,075,226 A | * | 6/2000 | Kishbaugh .................. 219/136 |

FOREIGN PATENT DOCUMENTS

| | | | |
|---|---|---|---|
| SU | 245241 | * 6/1967 | ................. 219/136 |

* cited by examiner

Primary Examiner—Clifford C. Shaw
(74) Attorney, Agent, or Firm—Mark W. Croll; John H. Pilarski; Donald Cayen

(57) ABSTRACT

A holder on an electric welding machine manages the machine cables and guns. The holder comprises a box that fits in a cutout in the machine top cover. The box has open front and top sides. At least one socket is supported in the box. A door is hinged to the box for pivoting between open and closed positions. When the door is in the closed position, it covers the box and conceals the sockets. The box and closed door are generally flush with the machine top cover. When the door is pivoted to the open position, it exposes the sockets, and a wall of the door is horizontal. The cable can then be hung from the open door, and the guns can be stored in the sockets. The door is retained in the open position by the cooperation of fingers on the door and depressions in the box. In a modified embodiment, the sockets are supported in the door, and they are rotatable on the door between retracted and working locations.

24 Claims, 8 Drawing Sheets

PIVOTABLE CABLE AND GUN HOLDER FOR MIG WELDER

BACKGROUND OF THE INVENTION

1. Field of the Invention

This invention pertains to electric welding, and more particularly to apparatus for managing the cables and guns associated with welding machines, including metal inert gas (MIG) welding machines.

2. Description of the Prior Art

Many wire feed MIG welding machines are capable of being easily switchable between welding steel and aluminum workpieces. Separate welding guns are required for the two different materials, as well as separate cables that connect the guns to the welding machine. To avoid frequent movement of the welding machine at a work site, the two cables are quite long, often reaching 30 feet in length.

Although long cable length is beneficial for reaching workpieces at a distance from the welding machine, the attendant disadvantage is that the cables are frequently in the way. That is especially true if the cables are merely left on the workplace floor when not in use. A cable lying on the floor, even if it is neatly coiled, presents a hazard for workers in the area. The fact that two cables are used with many MIG welding machines exacerbates the problem.

Electrically powered MIG welding machines are small enough to be transportable using running gears. Moving a welding machine with long cables is very cumbersome. Unless the machine includes a way to hold the cables in place on it, the cables must either be dragged along the work place floor, or manually carried, when the welding machine is transported. In either situation, the welding machine running gear is apt to run over the cables. It is possible to disconnect the cables from the welding machine when transporting it. However, that procedure does not eliminate the need to drag or carry the cables to the new location. In addition, unproductive time is required for the disconnecting and reconnecting process.

To solve the problems associated with long welding machine cables, it is known to equip welding machines with a static hanger. For example, the Miller Electric Company of Appleton, Wis., manufactures and markets a gun/cable holder that is attachable to a transportable MIG welding machine. The gun/cable holder includes an arcuate surface over which the cable is draped, as well as a short tube that receives the nozzle of the welding gun.

U.S. Pat. No. 2,866,076 shows a transportable electric arc welding machine having two U-shaped plates on the outside. One plate is designed to hold a welding gun. The cable between the welding gun and the welding machine is supported by a bracket on a frame of the machine running gear.

U.S. Pat. No. 3,247,807 discloses an engine-driven welding machine. A welding gun is holdable in a support on the outside of the machine. No provision is made for holding the cable between the gun and the machine.

Thus, a need exists for improvements in managing welding machine cables.

SUMMARY OF THE INVENTION

In accordance with the present invention, a pivotable cable and gun holder is provided that manages the guns and connecting cables of a MIG welding machine. This is accomplished by apparatus that includes a door that pivots between open and closed positions in a box that fits in the machine top cover.

The box has a back wall, opposed side walls, and open front and top sides. When the box is in the welding machine top cover, top and front edges of the box side walls, as well as the top edge of the box back wall, are substantially flush with the cover top and side panels. The door has front and top walls. The door front wall is hinged to the box at the lower end of the box open front side. When the door is closed, its front and top walls are substantially coplanar with the front and top edges, respectively, of the box side walls. Thus, the door top and front walls are substantially flush with the machine cover top and side panels. A catch maintains the door in the closed position until it is intentionally opened. When the door is open, its front wall is generally horizontal and perpendicular to the front panel of the machine top cover.

In one embodiment of the invention, the box has a arcuate bearing near the bottom of its open front side. Each side wall of the box has an arcuate surface concentric with the bearing. Each box side wall also has a groove between the box open front side and the associated arcuate surface. There is a floor between the side walls and the back wall above the bearing.

To pivot the door between the open and closed position, the door has a shaft portion that engages the box bearing. The door is held to the box by a resilient overcenter tab in the box. To engage the door shaft portion with the box bearing at assembly, the door shaft portion must first deflect the tab slightly. As the shaft portion fully engages the bearing, the tab resiliently returns to its normal position, where it cooperates with the bearing to hold the door in place.

The door includes a pair of oppositely protruding fingers. At assembly, the fingers slide through the grooves in the box side walls. The fingers emerge from the grooves in the box side walls and are proximate the arcuate surfaces on the box side walls when the door shaft portion is engaged with the box bearing. The door fingers ride on the box arcuate surfaces when the door pivots between the open and closed positions. The door is retained at its open position by contact of the fingers with a depression in each of the box side walls.

The present invention further comprises a pair of tubular sockets. According to one aspect of the invention, the sockets are supported in the box on the box floor. Each socket has two short oppositely extending lugs near a bottom end. One lug is captured in a hole in a box side wall, and the other lug is captured under a hook the box back wall. Preferably, there is an opening in each socket at the bottom end.

When the door is closed, the holder of the invention is an unobtrusive component of the welding machine, which can be used in the normal manner in every respect. When the door is open, however, its front wall functions as a hanger for neatly holding the welding machine cables. In addition, the open door exposes and provides easy access to the sockets supported in the box. The machine guns can be inserted into the sockets to store them in place until needed.

In a modified embodiment, the sockets are supported in the door instead of in the box. To provide increased accessibility to the sockets, they are rotatable in the door between retracted and working locations. When the sockets are in the retracted location, they lie within the envelope of the door front and top walls. When the door is in the closed position, the sockets nest within the box. When the door is in the open position, the sockets can be rotated to their working locations whereat they are outside the door envelope. In that location, they are more convenient for receiving and storing the welding guns.

In another embodiment, pivoting of the door on the box is achieved by the cooperation of a shaft portion in the box and a bearing in the cover. Outturned fingers on the door abut small plates in the box to retain the door in the open position. The sockets for the welding machine guns can be supported either in the box or in the door.

Other advantages, benefits, and features of the present invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
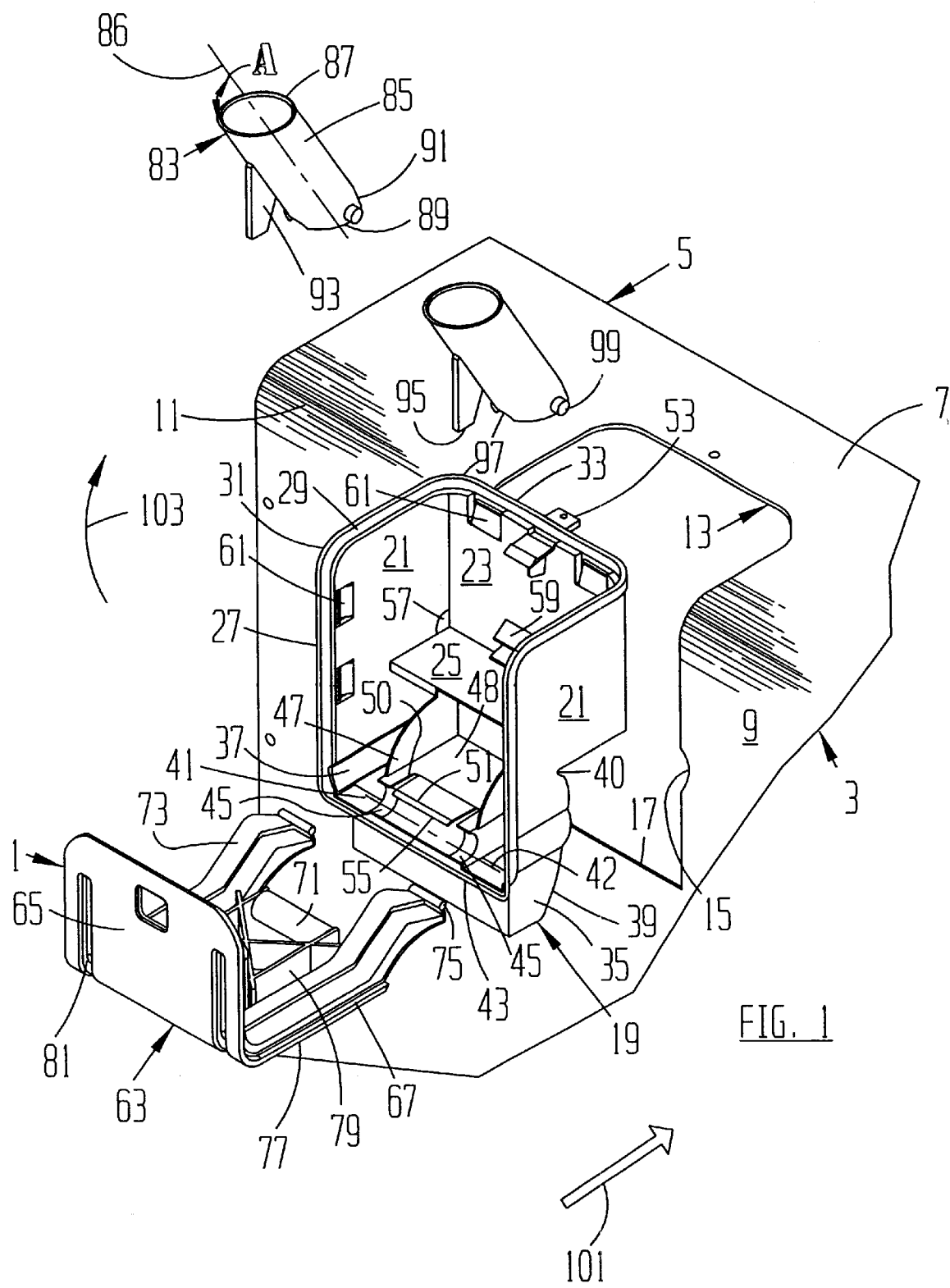
FIG. 1 is an exploded perspective view of the present invention.

Referring first to FIG. 1, a pivotable cable and gun holder 1 is illustrated that includes the present invention. The pivotable cable and gun holder 1 is particularly useful with wire feed metal inert gas (MIG) welding machines 3, but it will be understood that invention is not limited to welding applications.

The particular welding machine 3 shown has a top cover 5 with a generally horizontal top panel 7 and a generally vertical panel 9. The top panel 7 and front panel 9 join at a corner 11 having a relatively large radius. The machine top cover 5 is cut out at reference numeral 13 in the top and front panels. There are a pair of opposed small recesses 15 in the cutout 13 near a bottom edge 17 of the cutout.

Box

Figure 3:
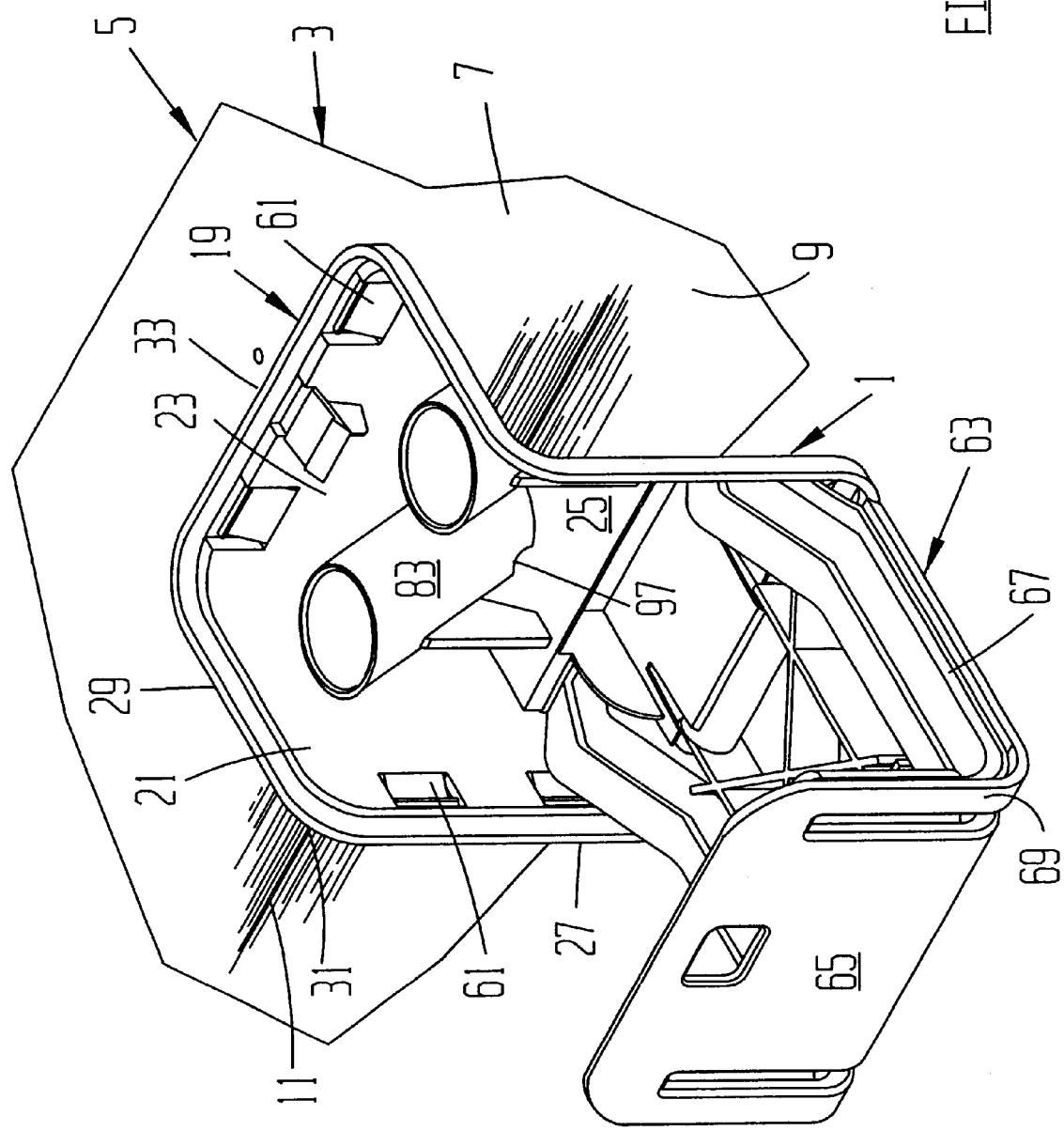
FIG. 3 is a perspective view on an enlarged scale of the invention with the door in the open position.
Figure 4:
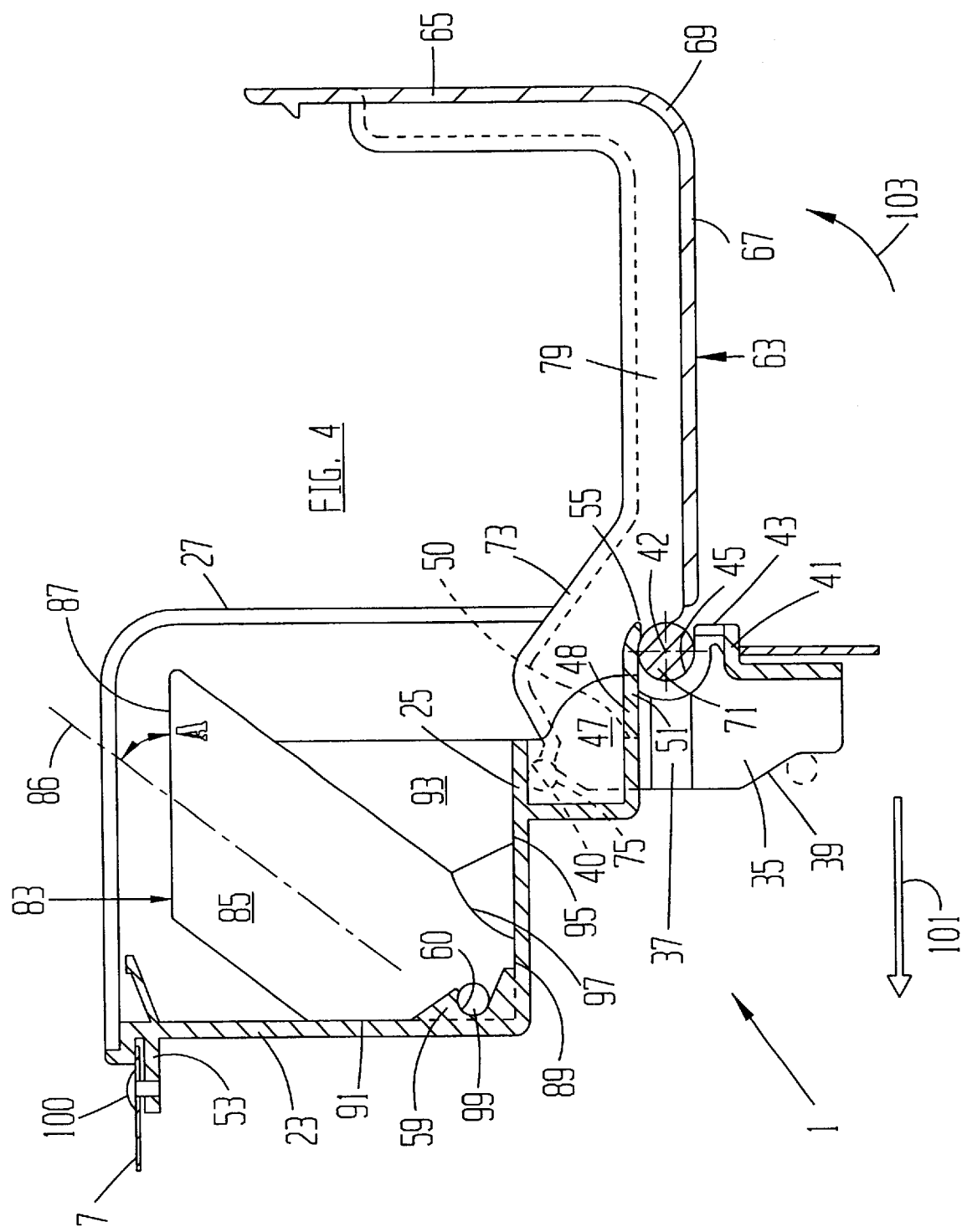
FIG. 4 is a longitudinal cross-sectional view of the invention with the door in the open position.

Looking also at FIGS. 3 and 4, the holder 1 comprises a box 19, having opposed side walls 21, a back wall 23, and a floor 25. The side walls 21 have respective front edges 27 and top edges 29. The side walls front edges 27 and top edges 29 meet at corner edges 31. The corner edges 31 have respective radii that match the corners 11 of the machine top cover 5. The box side and back walls have resilient latches 61. The box back wall 23 has a top edge 33. On the outside of the back wall 23 near the top edge 33 is a projection 53.

Each box side wall 21 has a lower section 35. In each lower section 35 is a groove 37. The grooves 37 extend from the front edges 27 of the box side walls to respective back surfaces 39 on the lower sections 35. The lower sections back surfaces 39 are arcuate in shape. The arcuate surfaces 39 have a common central axis 42 and terminate near the floor 25 in respective depressions 40.

There is a narrow bottom wall 41 between the side walls lower sections 35. The box wall 41 has a front edge 43 that is generally coplanar with the side walls front edges 27. Upstanding from the box bottom wall 41 are a pair of spaced apart bearings 45. The bearings 45 have the same central axis 42 as the arcuate surfaces 39 of the side walls lower sections. Between the bearings 45 and the floor 25 are a pair of vertical guides 47. There is a plate 48 between the bearings 45 and the floor 25 and between the guides 47. The plate 48 is slotted at reference numerals 50 to make a resilient central cantilevered tab 51. The tab 51 has a depending lip 55 at its free edge. The lip 55 is overcenter relative to the central axis of the bearings.

There is a hole 57 in each side wall 21 near the junctions with the back wall 23 and the floor 25. A hook 59 with an overcenter arcuate opening 60 is on the back wall midway between the side walls.

Door

Figure 2:
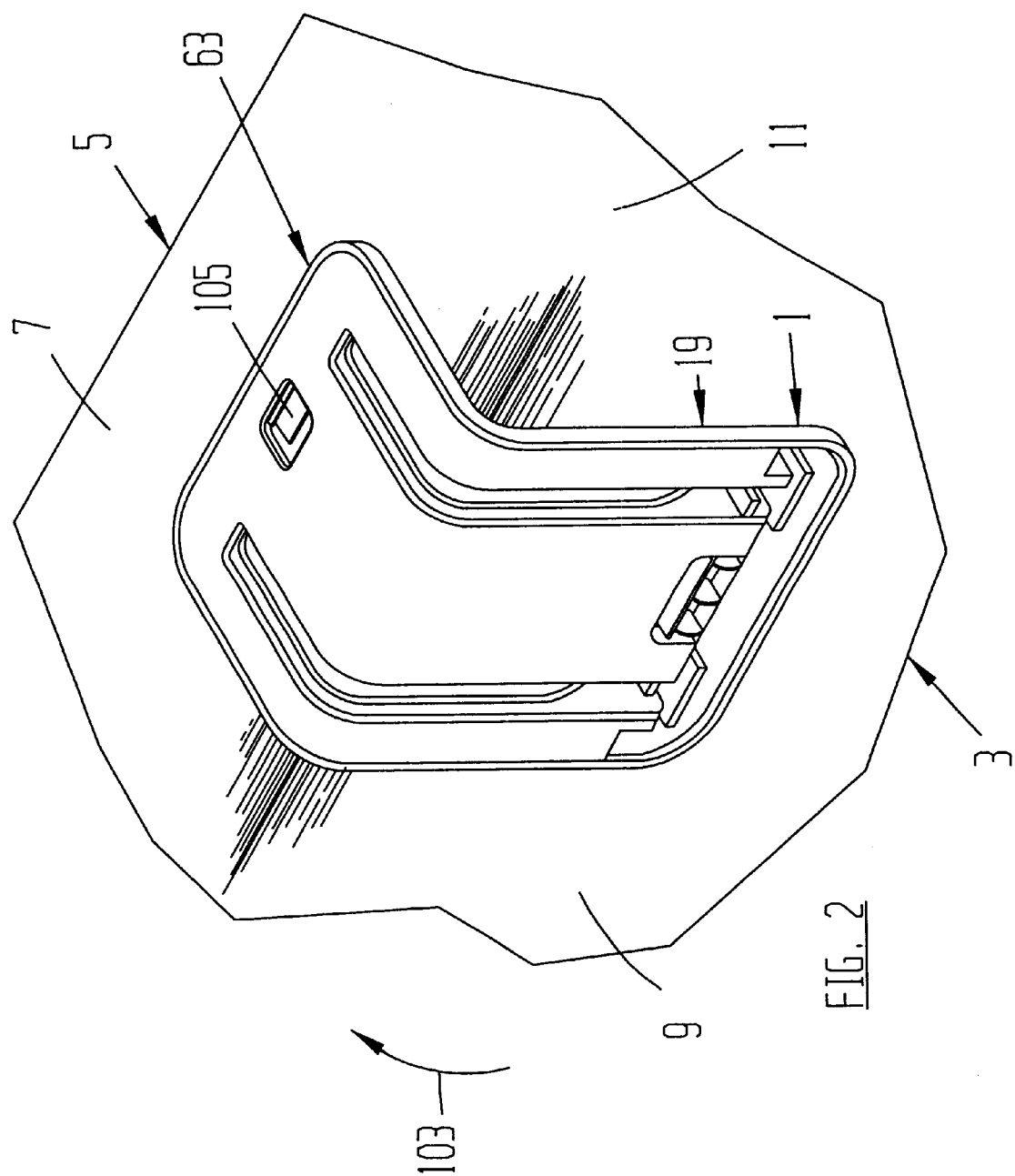
FIG. 2 is a perspective view of the invention with the door in the closed position.

The holder 1 further comprises a door 63. The door 63 is pivotable in the box 19 between a closed position as shown in FIG. 2 and an open position as shown in FIGS. 3 and 4.

The door 63 is comprised of a top wall 65 and a front wall 67. The top wall 65 and front wall 67 join at a corner 69. The corner 69 has the same radius as the welding machine top cover corner 11 and the box corner edges 31. The door walls and corner 69 are so dimensioned that when the door is in the closed position, it covers the open top and front sides of the box 19. In addition, the closed door lies substantially flush with the welding machine top cover panels 7 and 9 as well as the corners 11.

To enable the cover 63 to pivot, the free end of the front wall 67 is fabricated with a shaft portion 71. The shaft portion 71 has a diameter that matches that of the box bearings 45. Straddling the door shaft portion are a pair of arms 73. The arms 73 extend beyond the shaft portion, and they angle away from the front wall. On the end of each arm is a finger 75. The fingers 75 protrude outwardly past the common side edges 77 of the top and front walls. To provide maximum resistance to bending, the door has interior ribs 79 upstanding from both walls. A pair of channels 81 in the walls and arms impart additional bending strength to the door.

Socket

The final components of the holder 1 are a pair of sockets 83. Each socket 83 has a tubular wall 85 that defines a longitudinal centerline 86. Top and bottom ends 87 and 89, respectively, of the tubular wall 85 are open, and the ends may be parallel to each other. The top end 87 makes an angle A with the longitudinal centerline 86; a preferred angle A is between approximately 50 degrees and 90 degrees.

One side of the tubular wall 85 flattens at reference numeral 91 near the bottom end 89. The flat 91 is generally perpendicular to the tubular wall ends 87 and 89. On the side of the tubular wall opposite the flat 91 is a brace 93. The bottom edge 95 of the brace 93 is coplanar with the tubular wall bottom end 89. There is an opening 97 through the tubular wall at the bottom end. The sockets 83 further include a pair of lugs 99 that extend outwardly from the tubular wall close to the bottom end 89.

A preferred material for the sockets 83, as well as for the box 19 and door 63, is a heat resilient thermoplastic material such as moldable fiberglass-filled nylon.

Assembly And Operation

The box 19 fits in the cutout 13 in the welding machine top cover 5. The box side walls lower sections 35 around the grooves 37 fit into the recesses 15 in the cutout. The resilient latches 61 retain the box in the machine top cover. The box side wall edges 29 and the back wall edge 33 protrude only a slight amount above the machine cover top panel 7. Similarly, the front edges 27 of the box side walls 21 protrude only very slightly outwardly of the machine top cover side panel 9. A rivet 100 may be installed between the cover top panel 7 and the box projection 53.

The door 63 is removably assembled to the box 19 by first inserting the door fingers 75 into the box grooves 37. The door is pushed in the direction of arrow 101, sliding the fingers in the grooves, until the door shaft portion 71 contacts the lip 55 of the resilient tab 51. Further pushing the door in the direction of arrow 101 causes the tab to deflect upwardly such that the door shaft portion can pass the lip 55 and engage the box bearings 45. At that point, the tab resiliently returns to its normal position such that the lip holds the door shaft portion in the box bearings. In that manner, the tab cooperates with the bearings to pivotally hold the door to the box.

Simultaneously with the door shaft portion 71 engaging the box bearings 45, the door fingers 75 emerge from the box grooves 37. The door fingers are in a position such that they can contact the box arcuate surfaces 39.

The sockets 83 are assembled to the box 19 by placing their bottom ends 89 on the box floor 25 with the flats 91 of the tubular walls 85 against the box back wall 23. One lug 99 of each socket is placed in a corresponding box hole 57. The other socket lug is pushed into the overcenter opening 60 in the box hook 59.

FIGS. 3 and 4 show the door 63 in the open position. When the door is in the open position, the box top and front sides are uncovered, and the door front wall 67 is generally horizontal. The door is retained in the open position by contact of the door fingers 75 with the depressions 40 in the box side walls lower sections 35.

From the open position of FIGS. 3 and 4, the door 63 is pivotable by means of the box bearings 45 and door shaft portion 71 in the direction of arrow 103 to a closed position, FIG. 2. As the door pivots between the open and closed positions, the door fingers 75 ride along the associated arcuate surfaces 39 of the box 19. At the closed position, a catch 105 keeps the door from reopening unintentionally. When the door is in the closed position, it covers the open sides of the box 19 and conceals the sockets 83. The door is substantially flush with the welding machine top cover 5, so that the holder 1 of the invention does not detract from the appearance of the welding machine 3. In addition, the flush design of the closed holder 1 prevents it from snagging on clothing or other objects.

When the door 63 is in the open position, FIGS. 3 and 4, it performs two functions. First, it acts as a hanger for holding the welding machine cables used for both steel and aluminum welding. The holder 1 is strong enough to support 30 foot lengths of both cables at the same time. With the cables looped over the door, the entire welding machine 3 can be transported conveniently as a unit without having to drag the cables along the floor or to manually carry the cables. Further, prior concerns about running over the cables with the welding machine running gear are eliminated.

The second function performed by the open holder 1 is to provide a convenient storage place for the welding machine guns. When the door 63 is open, the two sockets 83 are exposed and accessible. The operator can insert the nozzle ends of the steel and aluminum welding guns in the sockets, where they remain stored in place within convenient reach until ready to be used. The openings 97 enable loosened weld spatter and other debris to escape from inside the sockets.

The door 63 can be removed from the box 19 by aligning the fingers 71 with the box grooves 37 and pulling the door outwardly in the direction opposite the arrow 101.

Modified Embodiments

Figure 5:
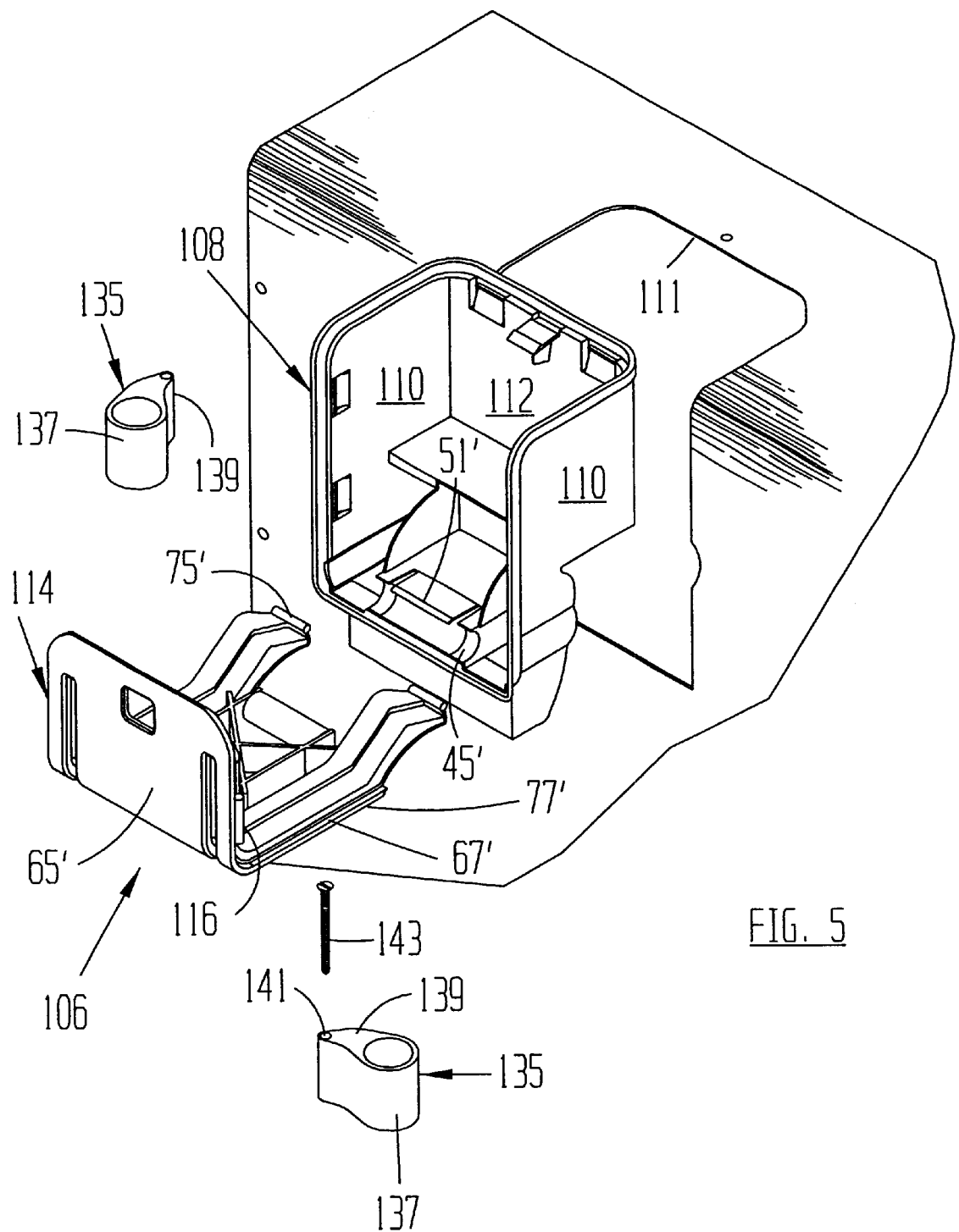
FIG. 5 is an exploded perspective view of a modified embodiment of the invention.
Figure 6:
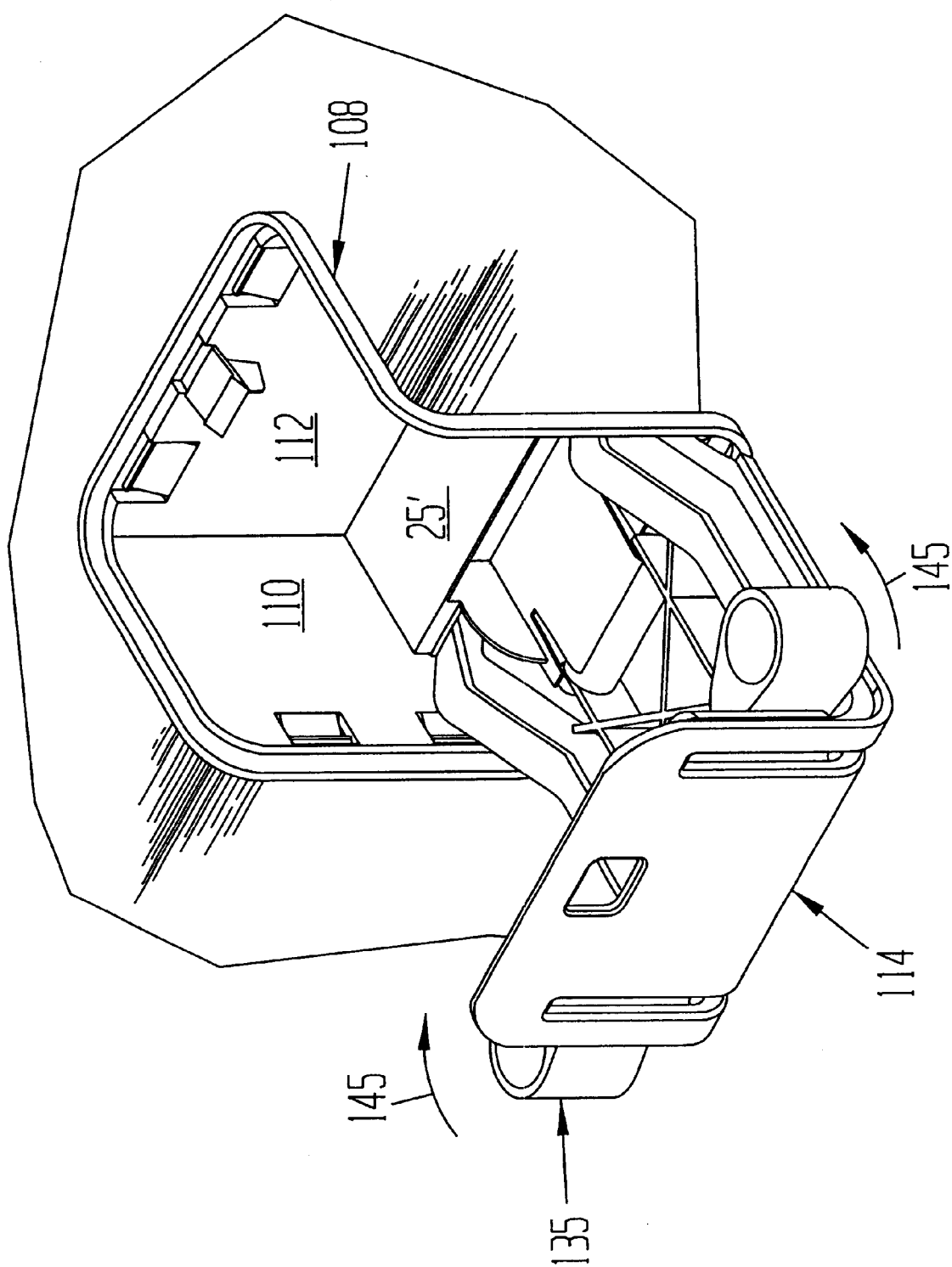
FIG. 6 is a perspective view of the holder of FIG. 5 showing it assembled with the door in the open position and the sockets in the working location.

Turning to FIGS. 5 and 6, a modified holder 106 for welding machine cables and guns is shown. The holder 106 comprises a box 108 that is generally similar to the box 19 described previously in connection with the holder 1 of FIGS. 1–4. The box 108 has side walls 110 that correspond to the side walls 21 of the box 19, but the walls 110 do not have holes through them. The box 108 has a back wall 112 without a hook analogous to the hook 59 of the box 19. The box 108 further has bearings 45' and a resilient tab 51' that correspond to the respective components of the box 19.

The holder 106 further comprises a door 114 that is generally similar to the door 63 of the holder 1. That is, the door 114 includes a top wall 65', a front wall 67', and side edges 77'. A pair of post portions 116 are integral with the inside of the top wall 65', with a post portion being close to each side edge 77'. Fingers 75' on the door engage the bearings 45' of the box 108 in the same manner as was described previously regarding the holder 1.

To store the welding machine guns, the holder 106 includes a pair of sockets 135. The sockets 135 have respective tubular sections 137 and wings 139 that project outwardly from the tubular sections. Each wing 139 has a clearance hole 141 through it. The sockets 135 are assembled to the door 114 by fasteners 143 passing through the socket holes 141 and engaging the door post portions 116.

As shown in FIG. 6, the sockets 135 are in a working location whereat they are outside the envelope of the door 114. In that location, the sockets are readily accessible for storing the welding machine guns. From the working location, the sockets are rotatable in the directions of arrows 145 such that they are in a retracted location inside the door envelope. When the sockets are in the retracted location, the door can be closed. The sockets then nest inside the box 108 between the walls 110 and 112 and the floor 25'.

Figure 7:
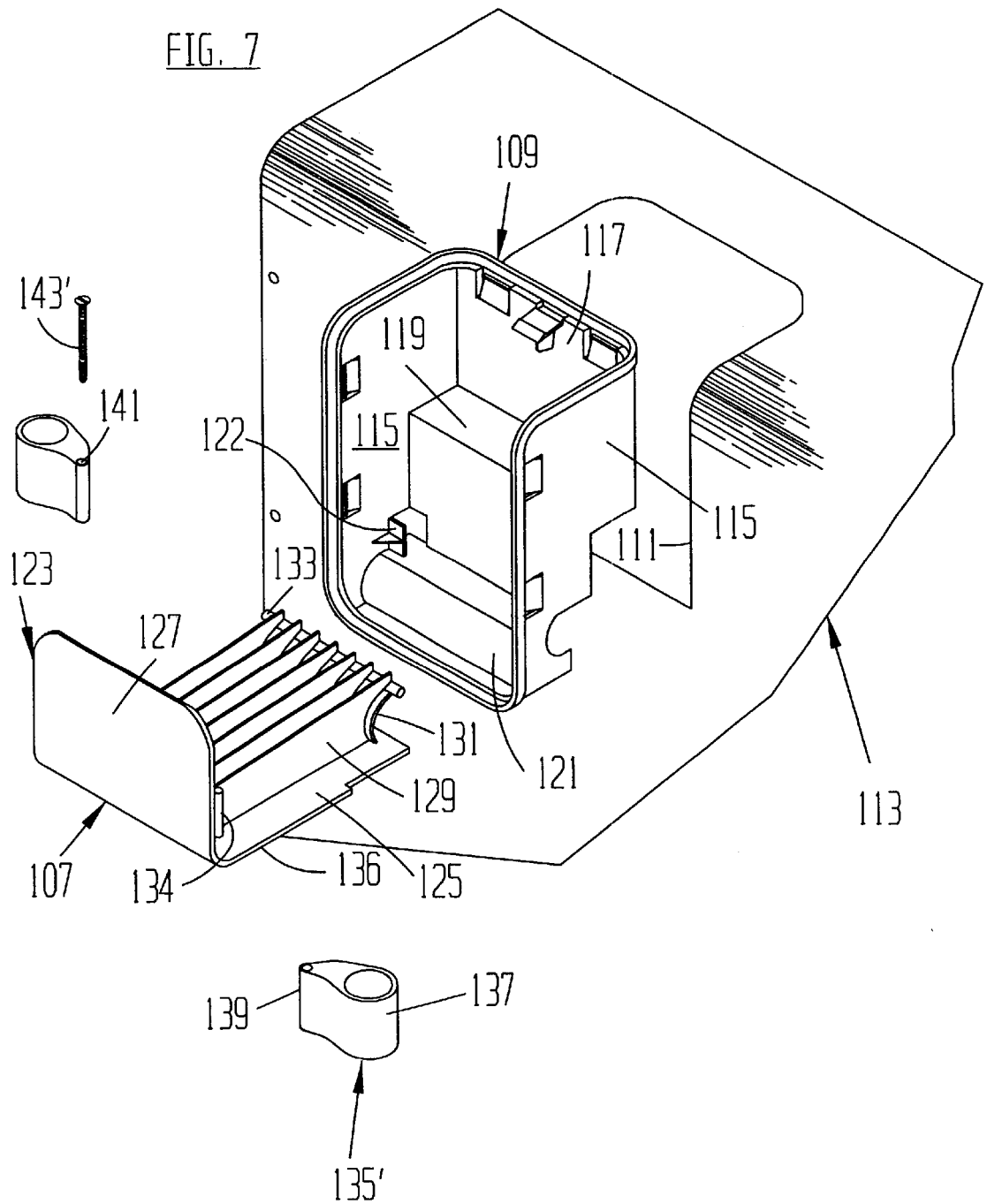
FIG. 7 is an exploded perspective view of another embodiment of the invention.
Figure 8:
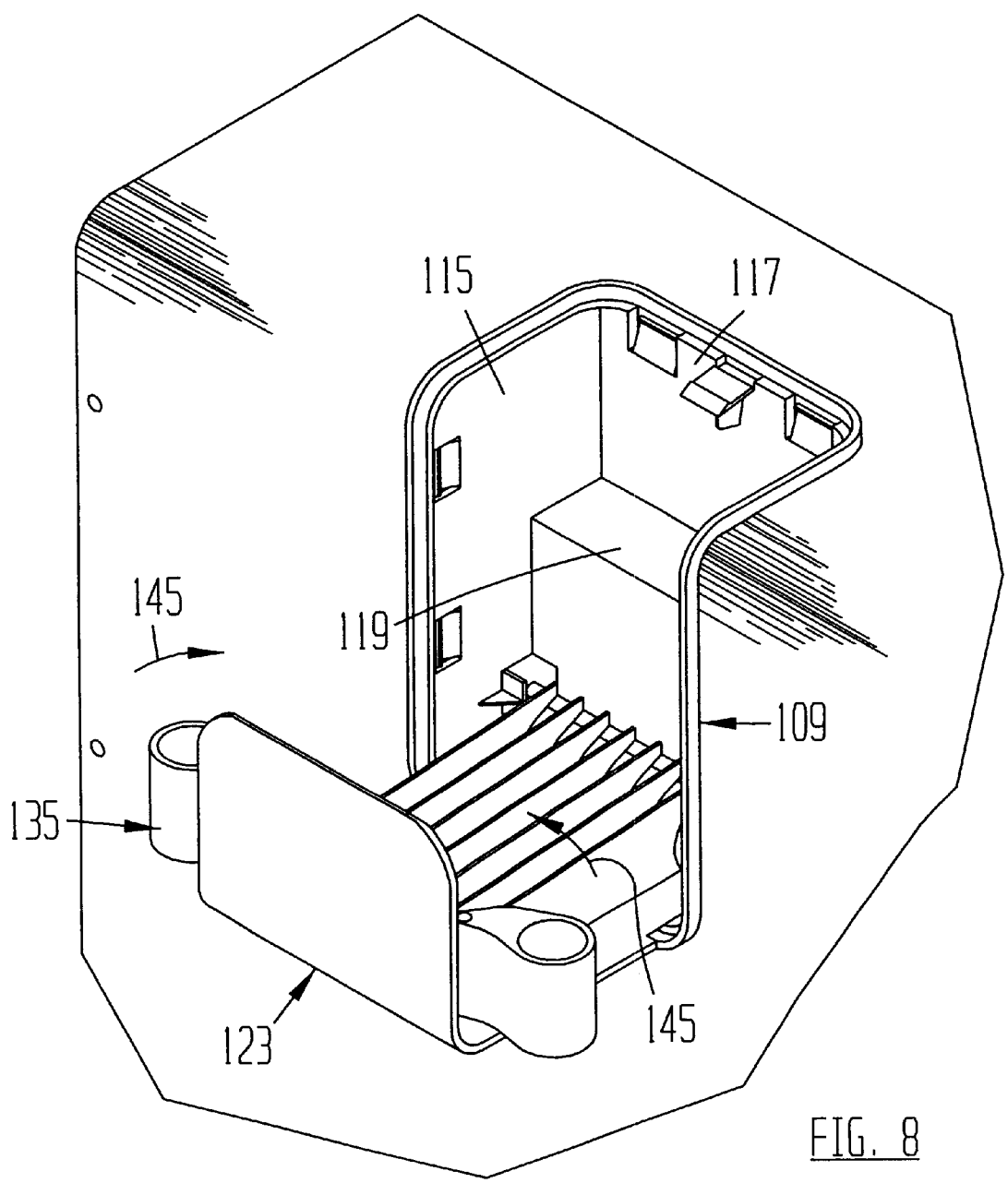
FIG. 8 is a perspective view of the holder of FIG. 7 showing the sockets assembled to the door and in the working location.

FIGS. 7 and 8 show a further modified holder 107 according to the present invention. The holder 107 comprises a box 109 that fits in a cutout 111 of a welding machine top cover 113. The box 109 has side walls 115, a back wall 117, and a floor 119. Near the bottom of the box is a shaft portion 121. There is an inwardly facing plate 122 in each side wall 115 a short distance from the shaft portion 121.

The door 123 of the holder 107 has a front wall 125 and a top wall 127. A series of ribs 129 on the front wall 125 connect to an arcuate bearing 131. A pair of fingers 133 protrude oppositely from the arcuate bearing 131. A pair of short post portions 134 lie alongside the door top wall 127 near the door edges 136.

The door 123 is assembled to the box 109 by placing the door fingers 133 alongside the box side walls 115 and behind the plates 122. Doing so brings the door arcuate bearing 131 into engagement with the box shaft portion 121. The door is then able to pivot between the open position of FIGS. 7 and 8 and a closed position, not shown, but very similar to the situation of the closed door 63 of the holder 1, FIG. 2. The door 123 is retained in the open position by the abutment of the door fingers 133 on the box plates 122.

The holder 107 includes sockets 135' and fasteners 143' that correspond to the sockets and fasteners of the holder 106 described above with regard to FIGS. 5 and 6. The sockets 135' are assembled to the door post portions 134 by the fasteners 143' for rotating between a working location whereat they are outside the envelope of the door 123 for storing the welding machine guns, and a retracted location such that they are inside the door envelope. When the sockets are in the retracted location, the door can be closed, and the sockets nest inside the box 109.

Thus, it is apparent that there has been provided, in accordance with the invention, a pivotable cable and gun holder that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A cable and gun holder for a welding machine comprising:
   a. a box having side and back walls and open top and front sides, wherein the box side walls have respective lower sections each defining a back edge;
   b. a door having front and top walls;
   c. hinge means for pivotally holding the door to the box to enable the door to pivot relative to the box between an open position whereat the box front and top sides are uncovered, and a closed position whereat the box front and top sides are covered, wherein the hinge means comprises:
      i. a shaft portion on the door;
      ii. bearing means in the box for engaging the door shaft position; and
      iii. finger means on the door for cooperating with the back edges of the box lower sections to retain the door in the open position; and
   d. at least one socket that is exposed when the door is in the open position and that is concealed between the box and the door when the door is in the closed position.

2. The cable and gun holder of claim 1 wherein:
   a. the back edges of the box lower sections define respective arcuate surfaces; and
   b. the finger means comprises a pair of fingers on the door, each finger riding along an associated arcuate surface of the box lower sections when the door pivots between the open and closed positions.

3. The cable and gun holder of claim 2 wherein:
   a. the back surfaces of the box lower sections define respective depressions; and
   b. the fingers cooperate with the depressions to retain the door in the open position.

4. The cable and gun holder of claim 1 wherein the hinge means comprises a resilient tab in the box that cooperates with the bearing means to pivotally hold the door shaft portion in engagement with the bearing means.

5. A cable and gun holder for a welding machine comprising:
   a. a box having side and back walls and open top and front sides;
   b. a door having front and top walls;
   c. hinge means for pivotally holding the door to the box to enable the door to pivot relative to the box between an open position whereat the box front and top sides are uncovered, and a closed position whereat the box front and top sides are covered, wherein the hinge means comprises:
      i. a shaft portion in the box;
      ii. at least one plate in the box side wall proximate the shaft portion;
      iii. bearing means on the floor for engaging the box shaft portion; and
      iv. finger means on the door for abutting said at least one plate in the box to retain the door in the open position; and
   d. at least one socket that is exposed when the door is in the open position and that is concealed between the box and the door when the door is in the closed position.

6. A cable and gun holder for a welding machine comprising:
   a. a box having side and back walls and open top and front sides, wherein the box is fabricated with a floor between the side and back walls;
   b. a door having front and top walls;
   c. hinge means for pivotally holding the door to the box to enable the door to pivot relative to the box between and open position whereat the box front and top sides are uncovered, and the closed position whereat the box front and top sides are covered; and
   d. at least one socket that is exposed when the door is in the open position and that is concealed between the box and the door when the door is in the closed position, wherein said at least one socket has a bottom end that is supported on the box floor, and a top end that is remote from and unsupported by the box.

7. A cable and gun holder for a welding machine comprising:
   a. a box having side and back walls and open top and front sides, wherein:
      i. there is a hook on the box back wall between the side walls; and
      ii. at least one box side wall defines a hole;
   b. a door having front and top walls;
   c. hinge means for pivotally holding the door to the box to enable the door to pivot relative to the box between and open position whereat the box front and top sides are uncovered, and a closed position whereat the box top and front sides are covered; and
   d. at least one socket supported in the box and exposed when the door is in the open position and that is concealed between the box and the door when the door is in the closed position, wherein said at least one socket has a pair of lugs extending oppositely therefrom, one of the lugs being within the hole in the box side wall and the other lug being captured under the box hook to thereby assemble said at least one socket to the box.

8. A cable and gun holder for a welding machine comprising:
   a. a box having side and back walls and open top and front sides;
   b. a door having front and top walls;
   c. hinge means for pivotally holding the door to the box to enable the door to pivot relative to the box between an open position whereat the box front and top sides are uncovered, and a closed position whereat the box front and top sides are covered; and
   d. at least one socket supported in the door that is exposed when the door is in the open position and that is concealed between the box and the door when the door is in the closed position.

9. A cable and gun holder for a welding machine comprising:
   a. a box having side and back walls and open top and front sides;
   b. a door having front and top walls, wherein the door is fabricated with at least one post portion;
   c. hinge means for pivotally holding the door to the box to enable the door to pivot relative to the box between an open position whereat the box front and top sides are uncovered, and a closed position whereat the box front and top sides are covered; and
   d. at least one socket that is exposed when the door is in the open position and that is concealed between the box and the door when the door is in the closed position, wherein said at least one socket is assembled to said at least one door post portion.

10. The cable and gun holder of claim 9 wherein said at least one socket is rotatable between a working location whereat said at least one socket is outside an envelope of the door and a retracted location whereat said at least one socket is inside the envelope of the door, so that said at least one socket nests inside the box when said at least one socket is in the retracted location and the door is in the closed position.

11. An electric welding machine comprising:
 a. a frame having a top cover with a horizontal top panel and a vertical side panel and a cutout in the top and side panels;
 b. means in the frame for producing welding power;
 c. at least one cable for conducting the electric power to a welding gun; and
 d. a holder for managing said at least one cable and welding gun comprising:
  i. a box fit in the welding machine top cover cutout, the box having side walls, a back wall, at least one bearing that defines a central axis, and open top and front sides;
  ii. at least one socket supported in the box; and
  iii. a door having front and top walls, and a shaft portion that engages said at least one bearing in the box to enable the door to pivot between a closed position whereat it covers the box top and front sides and conceals said at least one socket, and an open position Whereat the box front and top sides are uncovered and said at least one socket is exposed, the door front wall being generally horizontal when the door is in the open position,
   so that said at least one cable is hangable on the door and the welding gun is storable in said at least one socket when the door is in the open position.

12. The welding machine of claim 11 wherein the box further comprises a resilient tab that cooperates with said at least one bearing to pivotally hold the door to the box.

13. The welding machine of claim 11 wherein:
 a. the box side walls have respective lower sections each defining an arcuate surface having the same central axis as said at least one bearing; and
 b. the door comprises a pair of fingers in contact with and riding along an associated box arcuate surface when the door pivots between the open and closed positions.

14. The welding machine of claim 13 wherein:
 a. the box side walls have respective grooves between the box front side and the arcuate surfaces; and
 b. the door fingers slide in the box grooves from the box open front side to the arcuate surfaces to enable the door to be assembled to the box and the shaft portion to engage said at least one box bearing.

15. The welding machine of claim 13 wherein the door is retained in the open position by the cooperation of the door fingers and associated depressions in the box arcuate surfaces.

16. The welding machine of claim 11 wherein:
 a. the box further comprises a floor between the side and back walls and generally perpendicular thereto; and
 b. said at least one socket has a bottom end supported on the box floor.

17. The welding machine of claim 16 wherein:
 a. said at least one socket has first and second lugs extending oppositely therefrom;
 b. the box has a hole in a side wall and a hook on the back wall; and c. said at least one socket is assembled to the box by the cooperation of the first lug with the hole in the box side wall and by the cooperation of the second lug with the hook in the box back wall.

18. The welding machine of claim 16 wherein said at least one socket defines an opening therethrough at the bottom end that allows debris to escape from the socket.

19. A method of managing a cable and gun of an electric welding machine having a top cover comprising the steps of:
 a. making a cutout in the welding machine top cover;
 b. fitting a box having open front and top sides in the welding machine top cover cutout;
 c. supporting at least one socket in the box;
 d. pivotally holding a door to the box; and
 e. pivoting the door to a closed position and covering the box front and open sides and concealing said at least one socket.

20. The method of claim 19 comprising the further steps of:
 a. pivoting the door to an open position and uncovering the box front and top sides and exposing said at least one socket;
 b. hanging the welding machine cable on the door; and
 c. storing the welding machine gun in said at least one socket.

21. The method of claim 20 wherein:
 a. the step of fitting a box comprises the step of providing a box with a pair of arcuate surfaces;
 b. the step of pivotally holding a door comprises the step of providing a door with a pair of fingers; and
 c. the step of pivoting the door comprises the step of riding the door fingers along the box arcuate surfaces.

22. The method of claim 21 wherein:
 a. the step of providing a box comprises the step of providing a box with a depression associated with each arcuate surface; and
 b. the step of pivoting the door to an open position comprises the step of contacting the depressions in the box arcuate surfaces with the door fingers and thereby retaining the door in the open position.

23. The method of claim 19 wherein the step of pivotally holding a door comprises the steps of:
 a. providing a resilient overcenter tab having a normal position on the box;
 b. pushing a shaft portion of the door against the tab on the box and deflecting the tab; and
 c. engaging the shaft portion of the door with a bearing in the box and simultaneously returning the tab to the normal position thereof whereat it cooperates with the bearing to pivotally hold the door to the box.

24. The method of claim 19 wherein:
 a. the step of fitting a box comprises the step of providing a box with a pair of side walls each with a hole therein and a back wall with a hook; and
 b. the step of supporting said at least one socket comprises the steps of:
  i. providing said at least one socket with first and second oppositely extending lugs;
  ii. placing the first lug of said at least one socket in a hole in the box side wall; and
  iii. pushing the second lug of said at least one socket in the hook in the box back wall.

* * * * *